United States Patent [19]

Anderson et al.

[11] Patent Number: 4,863,235

[45] Date of Patent: Sep. 5, 1989

[54] CONNECTOR FOR OPTICAL FIBER CABLE

[75] Inventors: Jerry M. Anderson, Austell; Thomas C. Cannon, Jr., Dunwoody; Bruce V. Darden, Lawrenceville, all of Ga.

[73] Assignee: American Telephone and Telegraph Company, AT&T Bell Laboratories, Murray Hill, N.J.

[21] Appl. No.: 887,468

[22] Filed: Jul. 21, 1986

[51] Int. Cl.[4] .............................................. G02B 6/38
[52] U.S. Cl. ............................ 350/96.21; 350/96.20
[58] Field of Search ............... 350/96.20, 96.21, 96.22, 350/96.23

[56] References Cited

U.S. PATENT DOCUMENTS

| | | | |
|---|---|---|---|
| 4,047,707 | 9/1977 | Arnold et al. | 350/96.20 |
| 4,167,303 | 9/1979 | Bowen et al. | 350/96.21 |
| 4,240,695 | 12/1980 | Evans | 350/96.21 |
| 4,279,466 | 7/1981 | Makuch et al. | 350/96.22 X |
| 4,283,125 | 8/1981 | Borsuk | 350/96.20 |
| 4,319,802 | 3/1982 | Bowes | 350/96.20 |
| 4,339,171 | 7/1982 | Makuch et al. | 350/96.20 |
| 4,353,620 | 10/1982 | Schultz | 350/96.21 |
| 4,512,630 | 4/1985 | Runge | 350/96.21 |
| 4,595,256 | 6/1986 | Guazzo | 350/96.21 |
| 4,632,507 | 12/1986 | Mignien et al. | 350/96.20 X |
| 4,687,797 | 7/1987 | Stape et al. | 350/96.21 |

FOREIGN PATENT DOCUMENTS 0054301  3/1983  Japan ............................... 350/96.23

OTHER PUBLICATIONS

J. M. Anderson, B. V. Darden, B. G. LeFevre and V. E. Kalomiris—*A Two-Fiber Tactical Fiber-Optic Connector*, International Wire & Cable Symposium Proceedings, '85.

J. F. Dalgleish, H. H. Lukas & V. E. Kalomiris—*Test Methods and Performance of a Multi-Channel Hermaphroditic Optical Fiber Connector*, International Wire & Cable Symposium Proceedings, 1981.

T. C. Cannon et al—Application Ser. No. 623,727 drawings—filed Jun. 22, 1984.

Yasukasu Kawamura and Yashio Kashima—*Optical Connectors for Singlemode Fibers, Lasers & Applications*, Sep. 1984.

*Primary Examiner*—John D. Lee
*Assistant Examiner*—Phan T. Heartney
*Attorney, Agent, or Firm*—Edward W. Somers

[57] ABSTRACT

In a hermaphroditic connector (20), an optical fiber cable (24) extends through a cap (46) into a tapered passageway of a flanged bushing. Optical fibers extend through a bore in a wedge (65) having a truncated conical shape and being received in the bushing. Portions of non-metallic filamentary strength member (28) of the cable are captured between surfaces of a wall of the tapered passageway and the wedge which are substantially smooth to avoid damage to the strength members. Forces applied to the cable cause the wedge to be seated further in the bushing. The included angle between diametrically opposite lines on the wedge surface that lie in a plane passing through the longitudinal axis of the wedge enhances the locking features. The fibers also extend through a retention nut (70) which is turned threadably over a portion of the bushing and each fiber is connected to a plug (94) mounted adjacent to an end of the connector with one plug being received in an alignment sleeve (130). A retainer (140) is disposed over the sleeve and the other plug and includes alignment posts (145—145). When another connector is assembled hereto, a plug of the other connector is received in the unused end of the sleeve and a sleeve extending from another plug of the other connector receives the other plug of this connector.

16 Claims, 5 Drawing Sheets

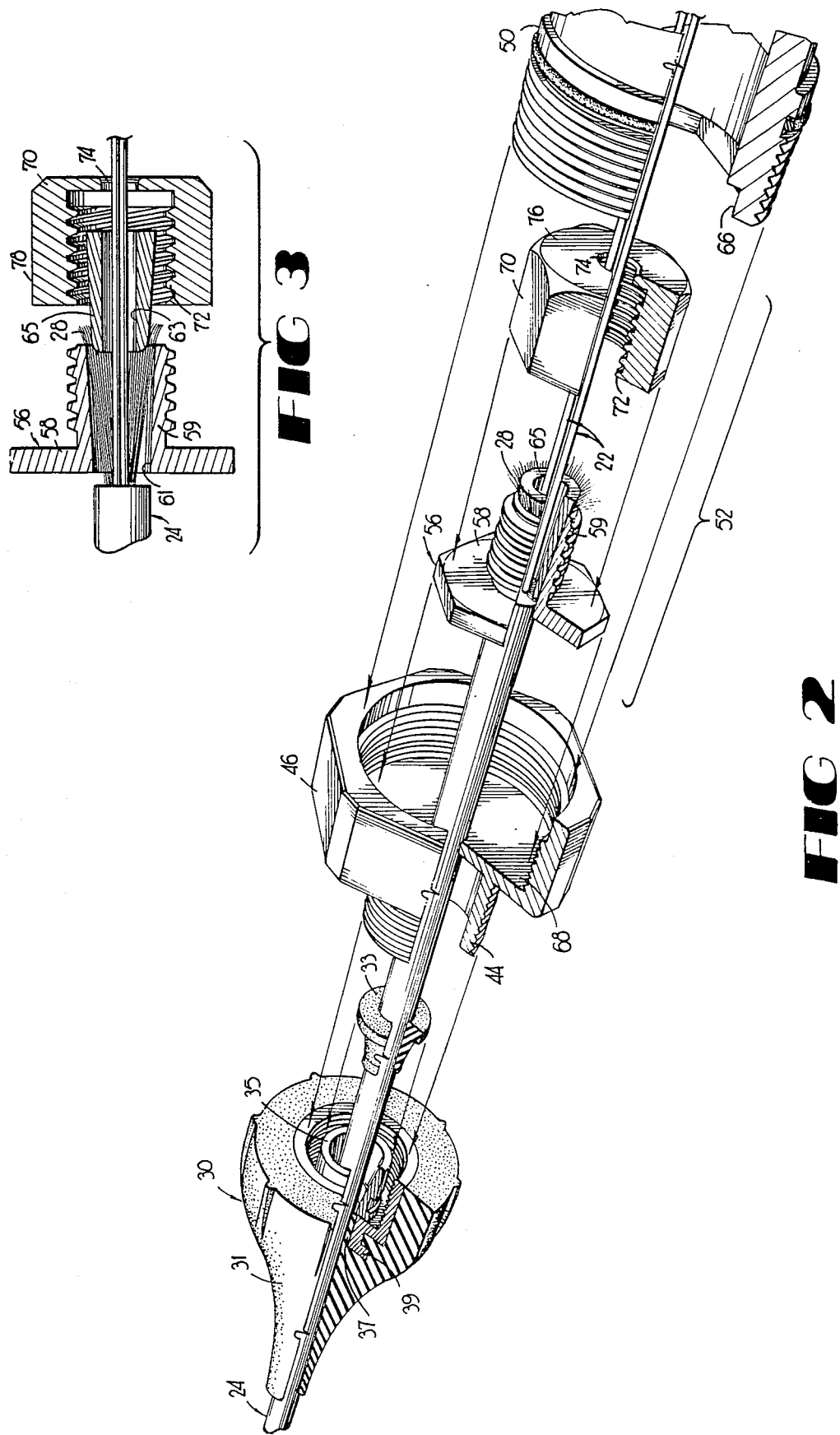

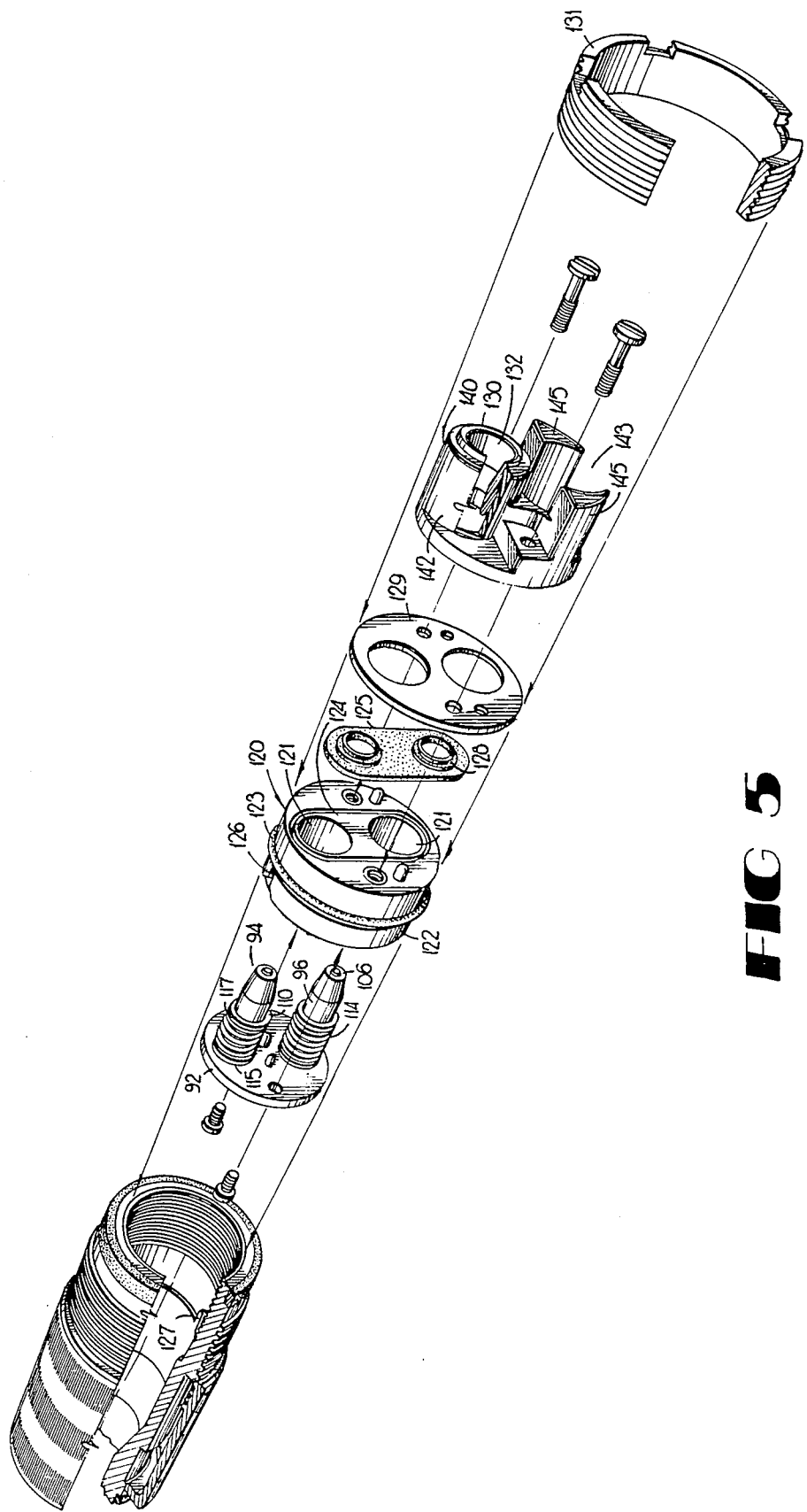

CONNECTOR FOR OPTICAL FIBER CABLE

The Government has rights in this invention pursuant to contract no. DAAB07-84-CK551 awarded by the Department of the Army.

TECHNICAL FIELD

This invention relates to a connector for optical fiber cable. More particularly, it relates to a hermaphroditic biconic connector having a self-enhancing strain relief arrangement which causes forces imparted to the cable to be transferred from non-metallic, filamentary strength members of the cable to a housing of the connector to avoid the application of the forces to the optical fibers and their terminations with plugs.

BACKGROUND OF THE INVENTION

The use of optical fibers in communications is growing at an unprecedented rate. Low loss optical fibers which are produced by any one of several techniques may be assembled into ribbons which are then assembled into cables, or stranded into cables, or they may be enclosed singularly in a jacket and used in various ways in a central office, for example.

In order to assure that the low loss optical fibers which are produced today are not diminished in their effectiveness in systems, the fibers are connected through intermateable connectors which preserve those low losses. For optical fiber ribbons, connectors comprise grooved chips which hold a plurality of fibers of one ribbon in alignment with fibers of another ribbon. Such a connector is shown for example in U.S. Pat. No. 3,864,018 which issued on Feb. 4, 1975 in the name of C. M. Miller.

For single fiber cables, connections may be made through a connector which is referred to as a biconic connector. See, for example, an article entitled "Interconnection for Lightguide Fibers" which was authored by T. L. Williford et al. and which appeared in the Winter 1980 issue of the *Western Electric Engineer* beginning at page 87.

The biconic connector includes a coupling having a housing in which is mounted a biconic alignment sleeve. The sleeve includes two conically shaped cavities which communicate with each other through a common plane which has the least diameter of each cavity. Each of two optical fibers to be connected is terminated with a plug comprising a truncated, conically shaped end portion which is adapted to be received in one of the cavities of the sleeve. Each fiber extends through the plug in which it is mounted and has an end which terminates in an end face of the plug. The plug is held in a cap having an externally threaded portion adapted to be turned into an internally threaded entrance portion of the housing. Portions of the conically shaped surfaces of the plug and of the sleeve are conformable and serve as alignment surfaces. Each plug is urged into seated engagement with the wall defining the cavity in which it is received while its associated cap is turned into the housing. Minimal loss between the connected fibers is achieved when the optical fibers which are terminated by the plugs are aligned coaxially and when the fiber end faces, each of which is planar, contact in the common plane.

In at least one optical fiber cable of the prior art which is to be terminated with a plug, a core comprising at least one optical fiber is enclosed in a jacket, non-metallic filamentary strength members such as polymeric yarn, for example, and an outer jacket. It becomes very important to prevent the transmittal of tensile forces to optical fibers at their terminations with the plugs. If this is not done, the fibers may be broken or microbending losses in the fiber may occur and degrade the quality of the transmission. Also, any forces which are not diverted to other portions of the connector may be imparted to a plug thereby disturbing its seating in the sleeve and its critical alignment with the other plug.

In order to avoid such losses at a connection, provisions must be made for avoiding the application of forces to the optical fibers after portions of a sheath system of the cable have been removed for termination. Instead, any pulling forces must be transferred to the connector housing. When a connection is to be made, the strength members must be coupled to a housing portion of the connector so that forces are transferred to the housing before the forces reach the optical fiber terminations.

This requirement becomes even more important in special environments. For example, a new optical fiber assembly has been developed to withstand stringent environmental and mechanical requirements which are imposed on tactical as well as on commercial communications equipment. One requirement is that there is no attenuation increase at an operating tensile load of about 1700 newtons.

The transfer of forces from the cable to the connector housing instead of to the plugs must be made simple and through a termination of the strength members. In one prior art device, polymeric yarn is held between cooperating surfaces of internal and external sleeves. The internal sleeve includes a bore through which the optical fibers extend and the external sleeve includes a conically shaped bore for receiving the internal sleeve. The polymeric yarn strands, for example, are passed through the bore of the internal sleeve and retroflexed about a peripheral end portion of the internal sleeve whereafter the external sleeve is caused to be disposed over the internal sleeve. This arrangement could lead to abrasion of the polymeric yarn where it engages the peripheral end portion of the internal sleeve. Also, the application of tensile forces to the cable may cause dislocation and an undoing of the terminations of the strength members.

It also is important that there be minimum contact of each plug with supporting surfaces when the plug is engaged with a plug of another connector within an alignment sleeve. In this way, misalignment of the plugs in the sleeve is minimized. Further, it becomes important to prevent the ingress of moisture into the connector while allowing for longitudinal and radial movement of the plugs so that they may become suitably disposed in alignment sleeves.

Seemingly, the prior art is devoid of a connector in which non-metallic filamentary strength members are secured to a housing of the connector and maintained as such during the application of forces to the cable while not compromising the integrity of the strength members. Desirably, connection of the strength members to the connector is accomplished in a manner which causes the secured terminations to be enhanced when the cable is subjected to tensile forces. Also, the sought-after connector should be one which facilitates alignment of plugs of connectors in sleeves and which prevents the ingress of moisture.

SUMMARY OF THE INVENTION

The foregoing problems have been solved by the optical fiber connector of this invention. The optical fiber connector is effective to terminate an optical fiber cable which includes at least one optical fiber and a non-metallic, filamentary strength system. Included in the connector are a housing having a longitudinal axis and force transfer means disposed adjacent to a cable entrance end of the housing and through which the optical fiber extends.

The force transfer means is effective to clamp the non-metallic strength system of the cable to transfer forces from the cable to the housing. Also, the force-transfer means includes two conformable, substantially smooth conically shaped surfaces which are held in mating relationship with each other with portions of the strength member system therebetween. Each surface diverges in a direction from the cable entrance end of the housing toward another end such that an included angle between diametrically opposed lines on each of the surfaces which are disposed in a plane passing through the axis of revolution of each surface does not exceed a predetermined value.

Plugs which terminate the optical fibers are disposed adjacent to the other end of the housing with a plug associated with one of the fibers being disposed in an alignment sleeve which in an opposite end thereof is adapted to receive a plug which terminates an optical fiber of another connector to be assembled to this connector. Retaining facilities are disposed at an entrance to the other end of the housing to retain the sleeve in the housing and to guide a sleeve of another connector to cause another plug of this connector to be received in one end of the sleeve of the other connector.

In a preferred embodiment, the force transfer portion of the connector comprises a bushing which includes a flange and a hub connected to the flange. The hub has threads formed externally thereon and has a passageway therethrough which is tapered to cause a small diameter portion to be adjacent to the flange. The passageway through the bushing is defined by a wall having a substantially smooth surface. A wedge having a truncated conical shape is adapted to conform to the wall which defines the tapered passageway of the bushing to capture non-metallic, filamentary strength members of the optical fiber cable between the wedge and the bushing when the optical fibers of the cable extend through the wedge. The outer surface of the wedge which mates with the wall of the bushing also is substantially smooth. As a result of this arrangement, tensile loads applied to the cable are transferred to the bushing to prevent damage to the optical fibers which are to be connected to other optical fibers. A fastener turned onto the hub holds the wedge within the bushing.

BRIEF DESCRIPTION OF THE DRAWINGS

Other objects and features of the present invention will be more readily understood from the following detailed description of specific embodiments thereof when read in conjunction with the accompanying drawings, in which:

FIG. 2 is a partially exploded perspective view of the connector of FIG. 1 at an end portion thereof where an optical fiber cable enters the connector;

FIG. 3 is an exploded elevational view in section of a force transfer portion of the connector of FIG. 1;

FIG. 5 is an exploded view of a plug end of the connector of FIG. 1;

DETAILED DESCRIPTION

Figure 1:
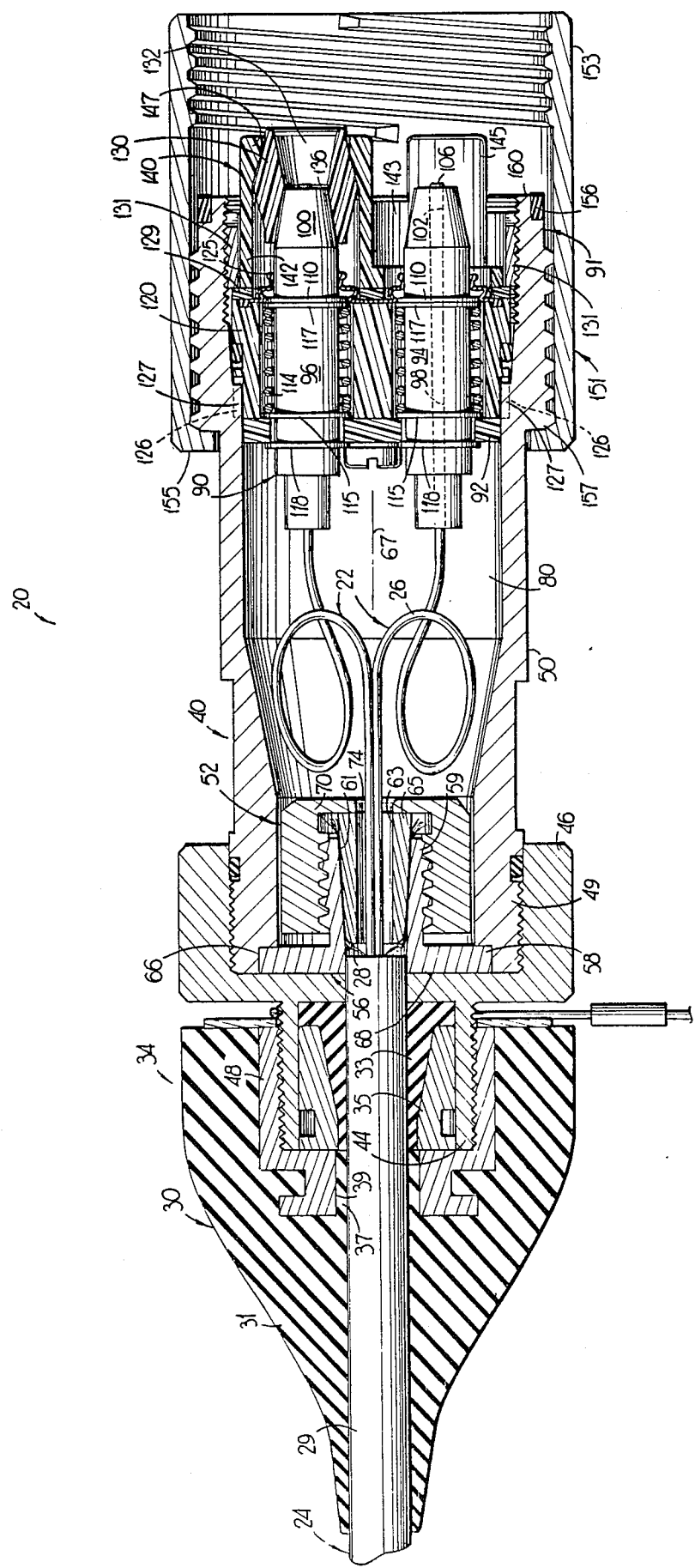
FIG. 1 is an elevational view partially in section of a hermaphroditic biconic connector for optical fiber cables which includes an alignment sleeve and two plugs each of which terminates an optical fiber.

Referring now to FIG. 1, there is shown a hermaphroditic connector which is designated generally by the numeral 20 and which is used to terminate optical fibers 22-22 of an optical fiber cable 24. Each of the optical fibers 22-22 may include a buffer cover 26 which is made of a plastic material. The optical fibers 22-22 are enclosed with a strength member system 28 (see also FIG. 2) which may be a polymeric yarn material and preferably a KEVLAR ® yarn, for example. A jacket 29 which may be made of a plastic material encloses a yarn. In the preferred embodiment, the cable 24 includes two optical fibers. The connector 20, which may be referred to as a first connector, is adapted to cause the optical fibers terminated therein to become connected to optical fibers which are terminated in a second connector, which is identical to the first connector.

The cable 24 extends through a strain relief portion 30 (see FIGS. 1 and 2) which is disposed at a cable entrance end 34 of the connector and which includes a somewhat conically shaped bend limiter 31. Also, the cable 24 extends through a cable seal 33, which may be made of neoprene, for example, and which is held in tight engagement with the cable 24 by a cable seal wedge 35. A port 37 of the bend limiter 31 is disposed between the cable 24 and a metallic insert 39 about which has been molded the bend limiter 31.

The cable 24 extends through the strain relief portion 30 and into a main portion 40 of the connector 20. Interposed between the cable seal wedge 35 and the metallic insert of the strain relief portion is a depending portion 44 of an end cap 46. The depending portion 44 of the end cap is threaded externally and is turned into an internally threaded cup-shaped portion 48 of the insert 39.

As may be viewed in FIG. 1, the right side portion of the end cap 46 is threaded internally so that the end cap can be turned onto an end portion 49 of a connector shell or housing 50. In a preferred embodiment, the connector shell 50 is made of a metallic material. The connector shell 50 is adapted to house device for terminating the optical fibers and a strength member retention system or device 52 which is effective to prevent tensile pulls on the cable from being transferred to the optical fibers and to their terminations with biconic plug portions of the connector 20.

Figure 4:
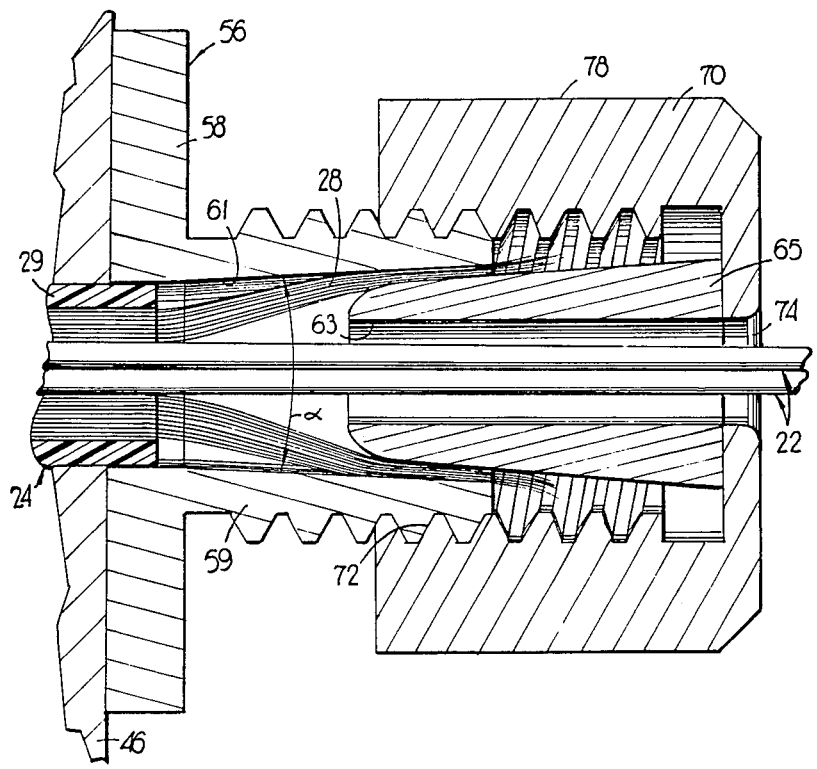
FIG. 4 is a side elevational view in section of the force transfer portion of FIG. 3 after it has been assembled with non-metallic filamentary strength members disposed between portions thereof.

Viewing now FIGS. 2 and 3-4, it can be seen that the device 52 includes a bushing 56 having a flange 58 and a hub 59. A passageway 61 is formed through the hub and the flange and is tapered through the hub and in the flange region with the small diameter portion oriented toward the bend limiter 31. The cable 24 extends to a location just within the flange whereafter the jacket 29 of the cable is removed to expose the strength member yarn and the optical fibers.

The optical fibers 22-22 extend through a bore 63 of a wedge 65 which is disposed within the passageway 61 of the bushing 56. Seated between a hexagonal, recessed portion 66 (see FIGS. 1 and 2) of an end of the connector shell 50 and an inner end surface 68 of the end cap is the flange 58 of the bushing 56 of the strength member retention system. Desirably, an included angle, α, between diametrically opposed lines on the inner surface of the tapered passageway 61 that appear in a sectional view when a plane is passed through the axis of revolution of that surface which generally is coincident with a longitudinal axis 67 (see FIG. 1) of the shell 50 does not exceed a predetermined value. It has been found that α should not exceed a value of about 6° and preferably is about 3°.

The strength member yarn is disposed between the tapered inner surface 61 of the bushing and a conformable tapered external surface of the wedge. As a result, portions of the strength member system 28 are held between these surfaces and any pull which is imparted to the cable 24 is transferred by the strength member system to the shell 50.

The wedge 65 and the bushing 56 cooperate to provide a self-enhancing locking arrangement for the strength member system 28 of the cable 24. As pulling forces are applied to the cable 24 at the strain relief end, these forces are transferred to the portions of the strength member system 28 which causes the wedge 65 to move to the left as viewed in FIG. 4. As this occurs, the wedge 65 becomes seated further in the passageway 61 of the bushing thereby further locking the yarn and preventing any strain from being transferred to the optical fibers.

In order to achieve a substantial locking action without damaging the non-metallic strength member system 28, the bushing 56 and the wedge 65 must be further characterized. The comformable surfaces of the wedge 65 and the bushing 56 must be substantially smooth. If not, portions of the non-metallic strength member system 28 conform to the surface roughness. As a result, non-uniform pressure as between portions of the roughened surfaces causes those portions of the strength member system to be crushed and non-effective in the transfer of forces from the cable 24 to the housing shell 50.

Also, the included angle α is important in reducing the angle which portions of the strength member system make as they exit the cable 24 and become disposed between the wedge 65 and the bushing 56. The greater the angle which the portions of the strength member system 28 make with the longitudinal axis 67 of the connector, the greater the probability for portions of the strength member system to break about the entrance to the annular conical space between the complementary surfaces. Further, the intersection between the outer surface of the wedge 65 and its small diameter end surface is formed with a radius to preclude damage to the non-metallic strength members.

It should be observed that this arrangement is advantageous from several standpoints. First, a locking arrangement which is self-enhancing is provided. The greater the pull, the greater the locking of the portions of the strength member system 28 within the connector 20. Also, unlike prior art connectors, portions of the strength member system 28 need not be retroflexed about a peripheral edge surface of a portion of the connector to secure the portions within the connector. Instead, the force-transfer portions of the strength member system are disposed at a relatively gentle angle to the longitudinal axis 67 of the housing between two substantially smooth surfaces.

The wedge 65 is further secured within the tapered bushing by a thrust nut 70. As can be seen in the drawings, the thrust nut 70 has an internally threaded wall 72 which defines a bore for receiving the hub 59 of the bushing 56 which is threaded externally. The thrust nut 70 also includes a centrally disposed opening 74 in an end portion 76 thereof to allow the optical fibers to extend therethrough. An external surface 78 of the thrust nut is juxtaposed with an inner surface of the shell 50.

Forward of the device 52 is a connector cavity 80. In the connector cavity 80, excess lengths of the optical fibers 22-22 are looped and then terminated. Each of the optical fibers 22-22 of the cable 24 is terminated by a biconic connector assembly, designated generally by the numeral 90, in a plug end 91 of the connector 20. The biconic connector assembly 90 which is shown partially disassembled in FIG. 5 includes a retaining plate 92 which is held within the connector shell 50 for receiving two plug assemblies. Each plug assembly 90 includes a plug 94 which terminates one of the optical fibers 22-22 (see FIG. 1). As can be seen in FIGS. 1 and 5, each plug 94 includes a cylindrical portion 96, which includes a bore 98, and an end portion 100. The end portion 100, which is referred to as a primary pedestal, has a truncated conical shape and includes a passageway 102 that communicates with the bore 98.

A coated single optical fiber 22 which has been provided with a buffer comprised of a plastic material such as polyvinyl chloride, for example, and then assembled together with another such optical fiber to form the cable 24 is terminated with plug 94 (see again FIG. 1). The jacketing material and the coating are removed from an end portion of each buffered fiber. Then, the cable is inserted into the bore 98 until the bared end portion is received in the passageway 102 with an end portion of the fiber 22 extending into a secondary pedestal 106 (see FIG. 5). An end face of the end portion of the fiber 22 is coincident with the end face of the secondary pedestal 106.

Each plug 94 is provided with a retaining ring and a washer adjacent to its end portion 100. As can be seen in FIG. 1, each of the plug assemblies 90-90 includes a retaining ring 110 which is fixedly located about the plug 94 and abuts a washer 117. A compression spring 114 is disposed about the cylindrical portion 96 of the plug between the washer 117 and another washer 115 and the retaining plate 92. The plug 94 is positioned in a connector body 120 with the washer 115 in engagement with the retaining plate 92 to hold the plug within the shell. Another retaining ring 118 is positioned on the plug 94 on the opposite side of the retaining plate 92 to hold the plug therein. With the arrangement, the plugs 94-94 in the retainer plate 92 can be moved to the left as viewed in FIG. 1, compressing the springs 114-114 and disengaging each retaining ring 118 from the plate 92.

The connector body 120 which is positioned within the shell (see FIGS. 1 and 5) of the connector 20 is adapted to receive two plugs 94-94. The connector body comprises a cylindrical housing 122 which includes two opposed cavities 121-121 each of which is adapted to receive the cylindrical portion of a plug. An O-ring seal 123 is disposed about the connector body 120 and engages an inner surface of the shell to prevent ingress of moisture into the connector cavity 80. The connector body is provided with a keyway 126 which is adapted to receive a key 127 of the connector shell to prevent turning of the connector body within the shell 50. Also, the connector body 120 is secured within the shell 50 by an externally threaded retainer member 131.

A radial face of the connector body 120 is provided with an oval shaped recess 124 for receiving a bellows seal 125. The bellows seal 125 is oval-shaped and includes two spaced openings each provided with a funnel-shaped collar 128. Advantageously, each collar 128 is fit snugly about a plug 94 and is capable of permitting longitudinal movement of the plug. The bellows seal which is made of an elastomeric material is adapted to be held in the recess in the connector body 120 by a seal retainer 129.

As can be seen in FIGS. 1 and 5 of the drawings, each plug extends through the connector body and retainer with one adapted to be received in a cavity of an alignment sleeve 130. The alignment sleeve 130 comprises two opposed, conically shaped cavities 132-132 which meet at a common plane 136. Both the plug 94 and the sleeve 130 are made of a crushed silica-filled, transfer molding grade epoxy composition, for example. However, it should be understood that the plug and sleeve could be made of other materials, such as metallic materials, for example.

The alignment sleeve 130 is such that when end portions 100-100 of plugs 94-94 are received in the cavities 132-132, the ends of the secondary pedestals are in the vicinity of the common plane 136. Also, as a connection is made, the plug portions are moved through the openings defined by lips of the openings in the retainer plate 92 to move the retaining rings 118-118 out of engagement with the lips.

Figure 6:
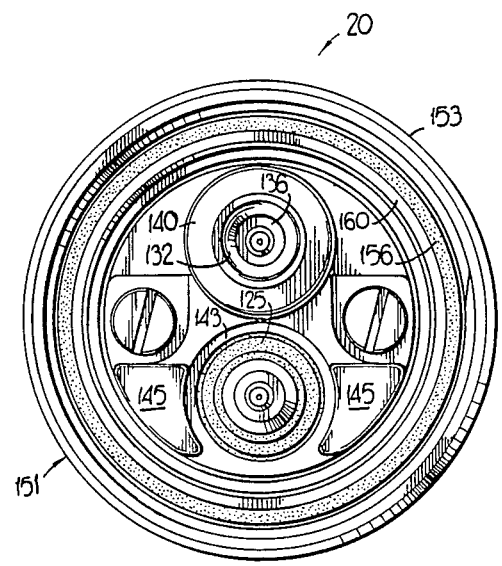
FIG. 6 is an end view of the plug end of the connector of FIG. 1.

The sleeve 130 extends into a sleeve retainer 140 (see FIGS. 1 and 5) which is supported at one end of the connector shell 50. The sleeve retainer 140 is made from an impact-resistant thermoplastic material. Also, the sleeve retainer 140 includes a boss 142 and an opening 143 diametrically opposed thereto (see also FIG. 6). Externally projecting plug-protecting posts 145-145 are disposed on opposite diametrical portions of the opening. The boss 142 is adapted to hold a biconic sleeve 130 in which is seated the truncated conically shaped end portion of one plug. An angled entrance portion 147 of the boss 142 causes the sleeve 130 to be retained in the boss and connector body 120. The opening 143 in the sleeve retainer is adapted to receive a boss of a second connector, that boss also having an alignment sleeve 130 therein.

When the first connector 20 is assembled with a second connector 20 and the sleeve 130 of the second connector is received in the opening 143, a plug end which is seated in the sleeve of the second connector is caused to become disposed adjacent to a plug of the first connector having an end portion which extends into the opening. At the same time, a plug of the second connector 20 which extends into the opening 143 of its sleeve retainer 140 extends into and becomes seated in the other end of the alignment sleeve 130 held in the first connector. As the second connector is moved to engage the first connector, its posts 145-145 encompass the boss 142 projecting from the first connector. As a result of the arrangement, the two connectors mate hermaphroditically. The spring 114 of each plug assembly causes the plug end portion 100 to be seated firmly in engagement with the wall of the alignment sleeve.

Figure 7:
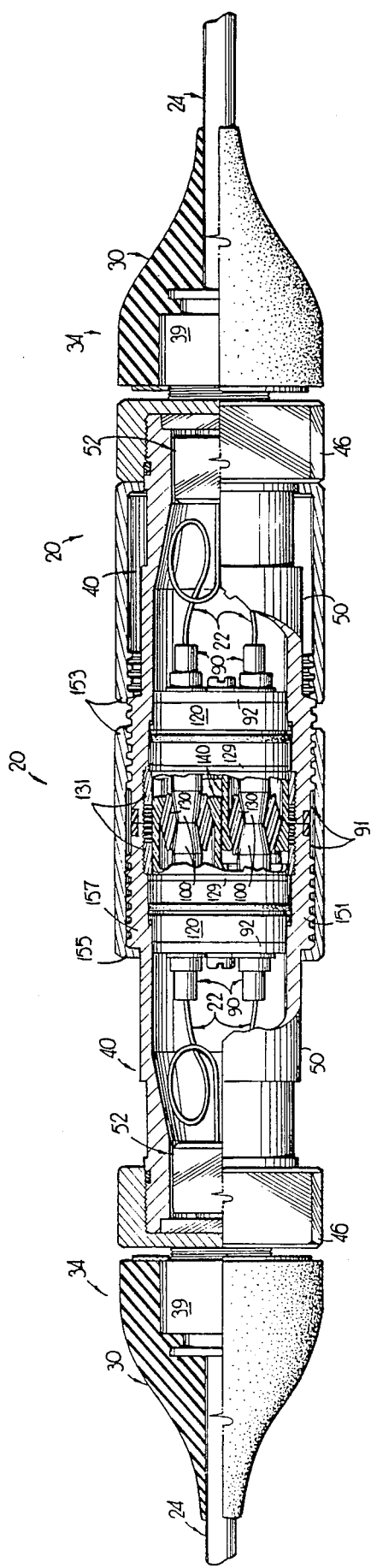
FIG. 7 is an elevational view partially in section which shows the assembly of two of the connectors of FIG. 1.

As seen in FIGS. 1 and 7, a leading end portion 151 of the connector shell 50 is threaded externally. As such, it is adapted to be turned into an internally threaded portion of a coupling nut 153. The coupling nut 153 extends forwardly of the sleeve retainer 140 so that it is adapted to receive the sleeve retainer of a second connector. Each connector 20 is provided with a coupling nut 153 which includes a lip 155 that is adapted to engage an abutment 157 of an end portion of the connector shell. When two connectors 20-20 are assembled together, the coupling nut 153 of a first one of the connectors is withdrawn from the leading end of the connector shell 50. The coupling nut 153 of a second connector is moved forward so that its threaded end engages the externally threaded portion of the first connector to secure together the connectors 20-20. It should be observed from FIG. 1, that prior to the assembly of the connector 20 with another, the secondary pedestal 106 of each biconic plug extends beyond a mating surface 160 of the connector. Therefore, in order for the surfaces 160-160 of the connectors to engage each other, the secondary pedestals and hence the plugs must be capable of moving inwardly into the shell 50. This is accomplished through the hereinbefore-described spring mounting of each plug.

Furthermore, in order to maximize the alignment of the biconic plugs and the axes of the optical fibers therein, it is desirable to minimize the contact of the biconic plugs with supporting surfaces. For example, to avoid bends in the sleeves, interference by the supporting structure is minimized. As can be seen best in FIG. 1, when another connector is assembled to the connector 20, the contact between end portions of the plugs causes each plug to be moved inwardly. This disengages the retaining rings 118-118 from the retaining plate 92 and the cone-shaped external portions of the sleeves from surface 147 of the boss 142. As a result, each plug tends to float within the connector 20.

Also, it should be observed that, advantageously, the bellows seal 125 because of its configuration is able to maintain a seal about each plug notwithstanding longitudinal and/or radial movement of the plugs which extend therethrough. This effectively prevents the ingress of moisture along the plugs whereas the O-ring 123 prevents the ingress of moisture between the connector body 120 and the shell 50.

Additional seals are provided to prevent the ingress of moisture. As can be seen in FIGS. 1 and 7, seals 156-156, which typically are made of rubber, are disposed on ends of the connector shells 50-50 and abut each other when two connectors are mated, thus blocking the ingress of moisture.

It is to be understood that the above-described arrangements are simply illustrative of the invention. Other arrangements may be devised by those skilled in the art which will embody the principles of the invention and fall within the spirit and scope thereof.

What is claimed is:

1. A hermaphroditic optical fiber connector for terminating an optical fiber cable which includes at least two optical fibers and a non-metallic filamentary strength system, said connector comprising;

a housing having a longitudinal axis and a cable entrance end;

force transfer means adapted to be disposed adjacent to the cable entrance end of said housing and through which the optical fibers are adapted to extend for clamping portions of the non-metallic strength system of the cable to transfer forces from the cable to said housing, said force transfer means including two conformable substantially smooth, conically shaped surfaces which are adapted to be held in mating relationship with each other with portions of the strength member system therebetween and such that each diverges in a direction from said cable entrance end of said housing toward another end thereof with an included angle between diametrically opposed lines on each of the surfaces which are disposed generally in a plane passing through the longitudinal axis of the housing not exceeding a value of about 6°; and termination means adapted to be disposed adjacent to said force transfer means for terminating optical fibers of the cable, said termination means including a first portion which is adapted to terminate one of the optical fibers of the cable and to receive a plug of another connector which terminates an optical fiber of another cable and a second portion which is adapted to be received in a portion the other connector, wherein said termination means includes plug means adapted to be disposed adjacent to the other end of said housing and including plugs each adapted to be associated with and to terminate one of the optical fibers;

sleeve alignment means adapted to have the plug associated with one of the fibers received in one end thereof and adapted to receive in an opposite end thereof a plug which terminates an optical fiber of another said connector which is adapted to be assembled to said connector; and retaining means adapted to be disposed at an entrance to the other end of said housing for retaining said sleeve alignment means in said housing and for guiding sleeve alignment means of another said connector during assembly with said connector to cause another plug of said connector which terminates another one of the fibers to be received in one end of the sleeve alignment means of said other connector.

2. The connector of claim 1, which also includes a bellows seal through which a portion of each said plug extends, said bellows seal being capable of permitting movement of each said plug in a direction along the longitudinal axis of said housing and in a direction transverse thereto to facilitate the juxtaposition of said plugs of said connector with plugs of another said connector while preventing the ingress of moisture into said connector.

3. An optical fiber cable which is terminated with a hermaphroditic biconic connector which includes provisions for transferring forces from non-metallic filamentary strength members of the cable to the connector, the terminated cable including:

an optical fiber cable which includes two optical fibers and non-metallic, filamentary strength members;

a housing having a cable input end into which the cable extends and a termination end;

a bushing which is disposed in said housing and which includes a tapered passageway which is defined by a substantially smooth surface;

a truncated conically shaped wedging member which is received in said passageway of said bushing and which has an outer surface which is substantially smooth and conformable to said surface of said bushing, said bushing and said wedging member cooperating to receive an end of the cable in a small diameter portion of said passageway with the non-metallic strength members being disposed between said surface of said bushing and said outer surface of said wedging member, said wedging member having a longitudinally extending bore through which optical fibers of the cable extend;

fastening means disposed within said housing and secured to said bushing to hold said wedging member in said bushing; and termination means being held in said housing adjacent to said termination end and oriented adjacent to the large diameter portion of said passageway and terminating the optical fibers of the cable, said termination means including a first truncated conically shaped plug which terminates one of the optical fibers of the cable and an alignment sleeve for receiving a leading portion of said first plug and a plug of another said hermaphroditic connector which terminates an optical fiber of another cable and a second truncated conically shaped plug which is adapted to be received in a sleeve of the other connector, said bushing and said wedging member cooperating to transfer forces imparted to the cable to the housing and thereby avoid the transmittal of the forces to the connection of the fibers to said termination means.

4. The terminated cable of claim 3, wherein said fastening means includes a thrust nut turned threadably onto an externally threaded portion of said bushing.

5. The terminated cable of claim 3, which also includes an end cap that encloses said bushing and said wedging member.

6. The terminated cable of claim 3, wherein a line disposed on the surface of the wedging member and disposed in a plane that passes through the longitudinal axis of the wedging member makes an angle of about 1.5 degrees with the longitudinal axis of the wedging member.

7. The terminated cable of claim 3, wherein said bushing includes a flange and a hub connected to said flange, said hub having threads formed externally thereon and having a passageway therethrough which is tapered to cause a small diameter portion to be adjacent to said flange, said passageway being defined by a wall having a substantially smooth surface; and said wedging member having a truncated conical shape which conforms to the tapered passageway of said bushing to capture the non-metallic, filamentary strength members of the optical fiber cable between the wedging member and the bushing with the optical fibers of the cable extended through the wedging member to cause tensile loads applied to the cable to be transferred to the bushing to prevent damage to the optical fibers which are terminated by said termination means.

8. The terminated cable of claim 7, wherein each of said plugs extends through a retaining plate and a connector body which are secured within said housing.

9. The terminated cable of claim 8, wherein said connector body includes a recess provided in an externally facing surface thereof and a bellows seal which is received in said recess, said sealing including two spaced openings in each of which is received a plug.

10. The terminated cable of claim 9, wherein said bellows seal includes a protruding entrance portion which grips a plug which extends therethrough to allow longitudinal and transverse movement of said plug while preventing the ingress of moisture.

11. The terminated cable of claim 5, which also includes a seal which is disposed about the cable adjacent to said end cap, said seal being held in compressed engagement with the cable by a wedge which is held in engagement with said seal by a metallic member having an internally threaded cavity which is in threaded engagement with threads formed about an outer wall of said end cap.

12. The terminated cable of claim 11, wherein said metallic member is an insert which is enclosed by a bend limiter which has been assembled to the cable.

13. The terminated cable of claim 3, wherein the intersection between an end surface of said wedging member and an outer tapered surface of said wedging member is formed with a radius to prevent damage to the strength members being passed therearound.

14. The terminated cable of claim 3, which also includes a sleeve retainer which includes a boss that is disposed over said alignment sleeve to facilitate entry of a plug of another connector and to hold said alignment sleeve in said housing and an opening aligned with said second plug for receiving an alignment sleeve of the other connector, said sleeve retainer also including two posts which are disposed adjacent to said opening to guide a boss of the other connector over said second plug with posts of the other connector becoming disposed about the boss of said connector.

15. The terminated cable of claim 14, wherein each of said posts includes an arcuate surface which conforms to and is adapted to become juxtaposed to an external surface of a boss of another connector with which said connector is to be assembled.

16. A hermaphroditic biconic connection system for connecting optical fibers of one optical fiber cable with optical fibers of another optical fiber cable, said connection system comprising:

first and second connectors which are adapted to be assembled together, each of said connectors adapted to terminate an optical fiber cable and each comprising:

a bushing having a flange adjacent to a cable entrance end of said connector and an externally threaded hub, said hub and flange having a tapered passageway formed therethrough with a small diameter end of said passageway being disposed at the flange end of said bushing;

a truncated, conically shaped wedge adapted to be received in said passageway of said bushing such that an included angle between diametrically opposed lines which are disposed on an outer surface of the wedge and in a plane passing through the axis of revolution of the surface does not exceed a predetermined value and such that non-metallic filamentary strength members of the optical fiber cable are captured between said wedge and said bushing, said wedge having a bore therethrough;

a thrust nut which is threaded internally and which is adapted to be turned onto the externally threaded hub of said bushing to hold said wedge within said bore;

an end cap for enclosing said bushing;

a connector shell which has one end adapted to be disposed between said end cap and said bushing and which has another end having a threaded outer wall;

a coupling nut which is adapted to enclose said other end of said shell and which is adapted to be turned over the threaded outer wall of a connector shell of another connector;

an alignment sleeve which is adapted to be disposed in said other end of said shell and which includes opposed conically shaped cavities;

a first truncated, conically shaped plug adapted to be disposed in an inner cavity of said sleeve with an optical fiber to be terminated by said plug extending through said shell, said thrust nut, said wedge and said bushing;

a second truncated, conically shaped plug adapted to be disposed within said connector shell adjacent to said alignment sleeve; and a sleeve retainer which includes a boss that is adapted to be disposed over said alignment sleeve to facilitate entry of a plug of another connector and to hold said alignment sleeve in said shell and an opening aligned with said second plug for receiving an alignment sleeve of the other connector, said sleeve retainer also including two posts which are disposed adjacent to said opening to guide a boss of the other connector over said second plug with posts of the other connector becoming disposed about the boss of said connector.

* * * * *

UNITED STATES PATENT AND TRADEMARK OFFICE
CERTIFICATE OF CORRECTION

PATENT NO. : 4,863,235
DATED : September 5, 1989
INVENTOR(S) : Jerry M. Anderson, et al.

It is certified that error appears in the above-identified patent and that said Letters Patent is hereby corrected as shown below:

Page 1 [75] Inventors: "Jerry M. Anderson, Austell; Thomas C. Cannon, Jr., Dunwoody; Bruce V. Darden, Lawrenceville, all of Ga."

should read: --Jerry M. Anderson, Austell; Thomas C. Cannon, Jr., Dunwoody; Bruce V. Darden, Lawrenceville, all of Ga.; Vasilios E. Kalomiris, Holmdel; Glenn A. Thaller, Lincoln Park, both of New Jersey--

Signed and Sealed this

Twenty-seventh Day of November, 1990

Attest:

HARRY F. MANBECK, JR.

*Attesting Officer*     *Commissioner of Patents and Trademarks*